US010171386B1

(12) United States Patent
Pendap et al.

(10) Patent No.: US 10,171,386 B1
(45) Date of Patent: Jan. 1, 2019

(54) METHODS AND SYSTEMS FOR STORING INSTANT MESSAGING MESSAGES (71) Applicant: Oracle America, Inc., Redwood City, CA (US)

(72) Inventors: Suresh D Pendap, Bangalore (IN); Diwaker Rana, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 628 days.

(21) Appl. No.: 14/841,702

(22) Filed: Aug. 31, 2015

Related U.S. Application Data (62) Division of application No. 10/960,234, filed on Oct. 6, 2004.

(51) Int. Cl.
*G06F 15/16* (2006.01)
*H04L 12/58* (2006.01)
*G06F 3/0482* (2013.01)
*G06F 3/0484* (2013.01)
*G06F 3/0481* (2013.01)

(52) U.S. Cl.
CPC .......... *H04L 51/043* (2013.01); *G06F 3/0481* (2013.01); *G06F 3/0482* (2013.01); *G06F 3/04842* (2013.01); *G06F 3/04847* (2013.01); *H04L 51/16* (2013.01)

(58) Field of Classification Search
CPC .. G06F 3/0481; G06F 3/0482; G06F 3/04842; G06F 3/04847; G06Q 50/01; H04L 12/1822; H04L 12/1831; H04L 51/04; H04L 51/043; H04L 51/16; H04L 65/403
See application file for complete search history.

(56) References Cited

U.S. PATENT DOCUMENTS 7,159,008 B1 * 1/2007 Wies .................. G06F 3/01
709/203
7,673,001 B1 * 3/2010 Battle .................. H04L 51/04
709/206

OTHER PUBLICATIONS

Pioch, Nicolas. "A Short IRC Primer." Jan. 1, 1997. pp. 1-36. Retrieved on Apr. 17, 2009 from <http://www.irchelp.org/irchelp/ircprimer.html>.*

* cited by examiner

*Primary Examiner* — Christopher Biagini
(74) *Attorney, Agent, or Firm* — Tarolli, Sundheim, Covell & Tummino LLP (57) ABSTRACT

Software for an instant messaging program displays a window in a graphical user interface (GUI). The window includes a first view listing a plurality of participants in an instant messaging conference, a second view allowing for entry and editing of an instant message, a first control for sending an instant message to all of the of participants, and a second control for sending a private instant message to less than all of the participants. The software receives an entry of an instant message in the first view. The software receives a selection of one or more but less than all participants through the second view. The software receives an input activating the second control. Then the software sends the instant message to the selected participants.

17 Claims, 7 Drawing Sheets

METHODS AND SYSTEMS FOR STORING INSTANT MESSAGING MESSAGES

CROSS REFERENCE TO RELATED APPLICATIONS

This application is a divisional application of U.S. application Ser. No. 10/960,234, filed on Oct. 6, 2004, also entitled "Methods and Systems for Storing Instant Messaging Messages". This application claims priority to and the benefit of that application. The disclosure of that application is incorporated by reference herein in its entirety for all purposes.

This application is related to U.S. application Ser. No. 10/681,590, filed on Oct. 7, 2003, and entitled "Search Engine Interface to an Instant Messaging Archive," the disclosure of this application is incorporated by reference herein in its entirety for all purposes.

BACKGROUND OF THE INVENTION

1. Field of the Invention

The present invention relates to instant messaging and, more particularly, to a method of storing instant messaging messages.

2. Description of the Related Art

Instant messaging allows a user to interact directly with another user or a group of users that are online. Specifically, instant messaging allows the user to easily see whether a group of chosen users are connected to the Internet and to exchange messages with them. Typically, instant messaging provides a conferencing capability that allows any suitable number of participants to join an instant messaging conference to have a group discussion. Accordingly, the messages transmitted between the participants in a conference may be viewed by all participants of the instant messaging conference discussion. After the termination of the instant messaging conference discussion, the conference messages may be archived in an instant messenger server for later retrieval and review.

During an instant messaging conference discussion, instant messaging may also provide the capability to transmit private messages to selected participants. In other words, a participant may transmit private messages to selected participants of the instant messaging conference discussion. To transmit private messages, current instant messenger programs automatically create separate chat windows to handle the private messages. As such, the creation of a separate chat window creates a separate stream of private messages that are archived separately from the conference messages. In effect, the private messages are archived as separate files from the conference messages and are also archived separately from each other.

A disadvantage of having separate archives of the private messages and the conference messages exchanged during the instant messaging conference discussion is that the private messages are not identified as being part of the instant messaging conference discussion. As such, the archived conference messages do not provide a complete record of all messages transmitted during the instant messaging conference discussion. Such complete record may be necessary for a user to fully understand the conference discussion. Additionally, since the private messages are not identified as being part of the instant messaging conference discussion, searching separately for the private messages that relate to the instant messaging conference discussion may be confusing, difficult, laborious, and prone to error.

As a result, there is a need to provide a method and a system for storing instant messaging messages of an instant messaging conference discussion such that a complete record of the instant messaging messages exchanged may later be retrieved.

SUMMARY OF THE INVENTION

Broadly speaking, the present invention fills these needs by providing methods and systems for storing instant messaging messages and graphic user interfaces for inputting instant messaging messages. It should be appreciated that the present invention can be implemented in numerous ways, including as a process, an apparatus, a system, computer readable media, or a device. Several inventive embodiments of the present invention are described below.

In accordance with a first aspect of the present invention, a method for storing instant messaging messages is provided. In this method, conference messages and private messages are received during an instant messaging conference discussion. The conference messages may be viewed by all participants in the instant messaging conference discussion. In contrast, the private messages are viewable by selected participants that do not include all the participants of the instant messaging conference discussion. Subsequently, the conference and private messages are stored together as a single record in a context data structure, and the single record enables maintenance of a unified record of the instant messaging conference discussion.

In accordance with a second aspect of the present invention, a computer system for storing instant messaging messages is provided. The computer system includes a memory configured to store an instant messenger server program, and a processor configured to execute the instant messenger server program stored in the memory. The processor is configured to execute the instant messenger server program. In one embodiment, the instant messenger program includes program instructions for receiving conference messages and private messages during an instant messaging conference discussion, and program instructions for integrating the private messages with the conference messages into a single record such that the single record enables the maintenance of a unified record of the instant messaging conference discussion. The instant messenger server program also includes program instructions for storing the single record after integration.

In accordance with a third aspect of the present invention, a graphical user interface (GUI) for inputting instant messaging messages rendered on a display coupled to a computing device is provided. The GUI includes a first region (first view) that lists a plurality of participants and receives entries of messages, and a second region (second view) that enables the input of conference messages and private messages such that the participants for the private messages may be selected. Additionally a third region (third view) is included for defining a command to enable the transmission of the inputted private messages to the selected participants from the second region.

In accordance with a fourth aspect of the present invention, a computer system for storing instant messaging messages is provided. The computer system includes means for receiving conference messages and private messages during an instant messaging conference discussion, and means for storing the conference and private messages together as a single record in a context data structure such that the single record enables maintenance of a unified record of the instant messaging conference discussion.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is disclosed for methods and computer systems for rendering, processing, storing, and providing interactivity for interfacing and managing instant messaging messages. In the following description, numerous specific details are set forth in order to provide a thorough understanding of the present invention. It will be understood, however, by one of ordinary skill in the art, that the present invention may be practiced without some or all of these specific details. In other instances, well known process operations have not been described in detail in order not to unnecessarily obscure the present invention.

The embodiments described herein provide methods and computer systems for storing instant messaging messages and graphic user interfaces for inputting, accessing, and managing instant messaging messages. In one embodiment, a separate chat window is not opened for private messages exchanged between participants participating in an instant messaging conference discussion. Instead, one window is provided for both private messages and conference messages. Thus, as will be explained in more detail below, the private messages and the conference messages are stored together as a single record that enables the maintenance of a unified record of the instant messaging conference discussion.

Figure 1:
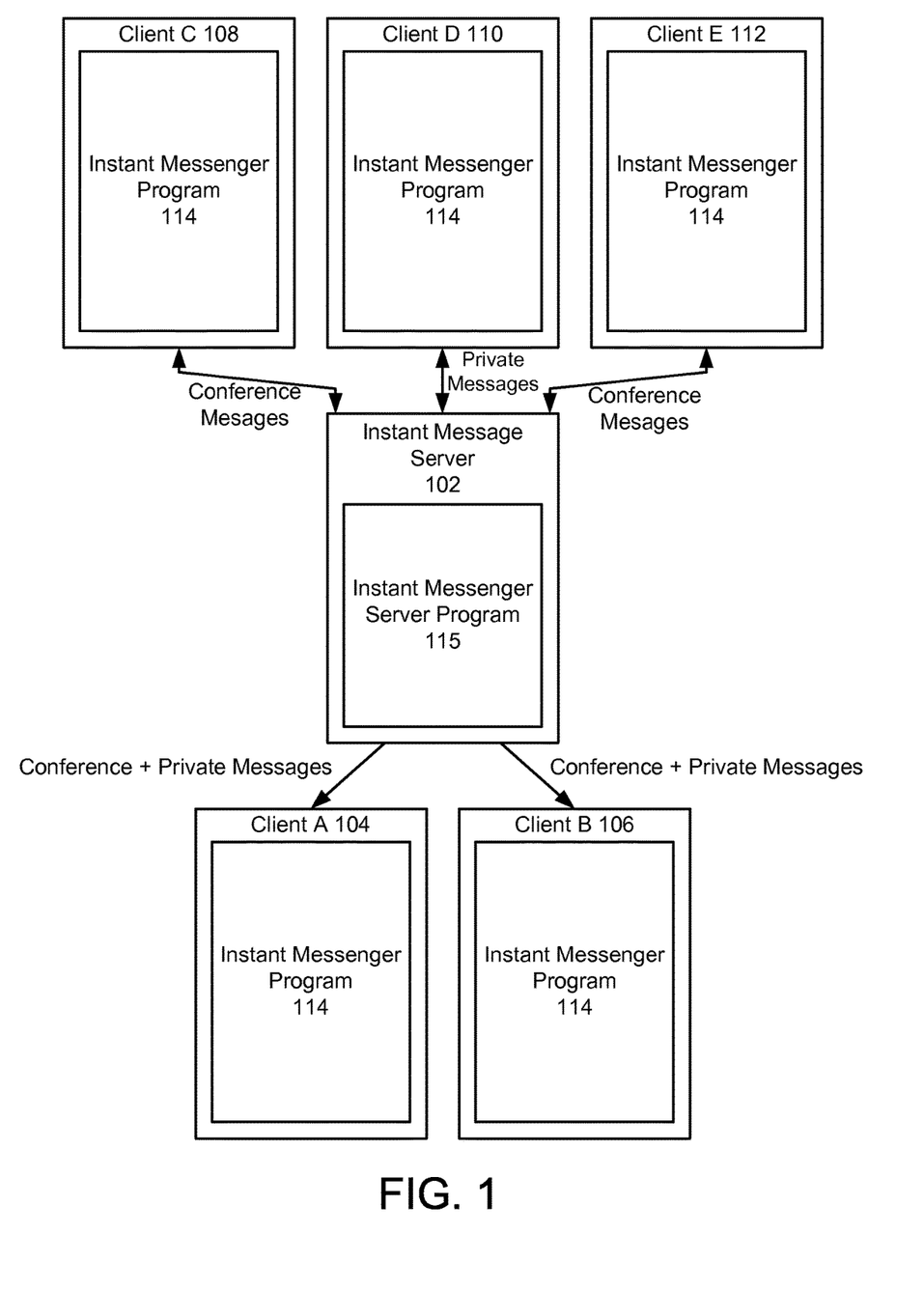
FIG. 1 is a simplified block diagram of an instant messenger server for storing instant messaging messages in communication with clients, in accordance with one embodiment of the present invention.

FIG. 1 is a simplified block diagram of an instant messenger server for storing instant messaging messages in communication with clients, in accordance with one embodiment of the present invention. As shown in FIG. 1, instant messenger server 102 is in communication with client A 104, client B 106, client C 108, client D 110, and client E 112. Instant messenger server 102 and clients 104, 106, 108, 110, and 112 may include any suitable type of computing device. For example, the computing device can include a computer system based on a microprocessor, a portable computing device, a personal digital assistant, a device controller, a cell phone, a computational engine within an appliance, etc.

It should be appreciated that clients 104, 106, 108, 110, and 112 are in communication with instant messenger server 102 through any suitable type of wire or wireless communication channel capable of linking together computing nodes (e.g., a local network, a wide area network, an open and modular development environment (EDMA) network, global systems for mobile communications (GSM) network, cable connection, etc.). There may be any suitable number of clients in communication with instant messenger server 102, and clients 104, 106, 108, 110, and 112 merely are representative of a number of the clients that have access to the instant messenger server, or to multiple instant messenger servers.

As shown in FIG. 1, instant messenger programs 114 are executed on clients 104, 106, 108, 110, and 112 and instant messenger server program 115 is executed on instant messenger server 102. Instant messenger programs 114 and instant messenger server program 115 allow messages to be exchanged between clients 104, 106, 108, 110, and 112 that are in communication with instant messenger server 102. For example, a participant of a "chat" on client A 104 may initiate the chat with another participant on client C 108 in which instant messaging messages between the client A and the client C are exchanged. The chat is terminated when either participants on client A 104 or client C 108 leaves the chat. A variant of chat is an instant messaging conference discussion where a virtual conference room is established. Any suitable number of participants may enter the virtual conference room and chat with other participants. In other words, a group of participants may join the instant messaging conference discussion to have a group discussion. Unlike a chat between two participants, the instant messaging conference discussion is not automatically terminated when one or more participants leave the instant messaging conference discussion. Instead, participants are free to leave or join the instant messaging conference discussion at any suitable time.

Each message posted to the instant messaging conference discussion is relayed by instant messenger server 102 to suitable participants of the instant messaging conference discussion on clients 104, 106, 108, 110, and 112. There are two types of instant messaging messages transmitted between clients 104, 106, 108, 110, and 112. The first type of instant messaging message is a conference message. The conference message is transmitted to all participants in the instant messaging conference discussion. For example, a participant on client A 104 may post a conference message whereby instant messenger server 102 transmits the conference message to all participants on client B 106, client C 108, client D 110, and client E 112. The second type of instant messaging message is a private message. The private message is viewable by selected participants that do not include all the participants of the instant messaging conference discussion. In other words, a private message is an instant messaging message directed to selected participants of the instant messaging conference discussion. For example, during an instant messaging conference discussion, the participant on client A 104 may post a private message directed to other participants on client B 106 and client E 112. Accordingly, instant messenger server 102 relays the private message from client A 104 to client B 106 and client E 112. The private message is viewable by participants on client B 106 and client E 112, but not by participants on client C 108 and client D 110.

Figure 2:
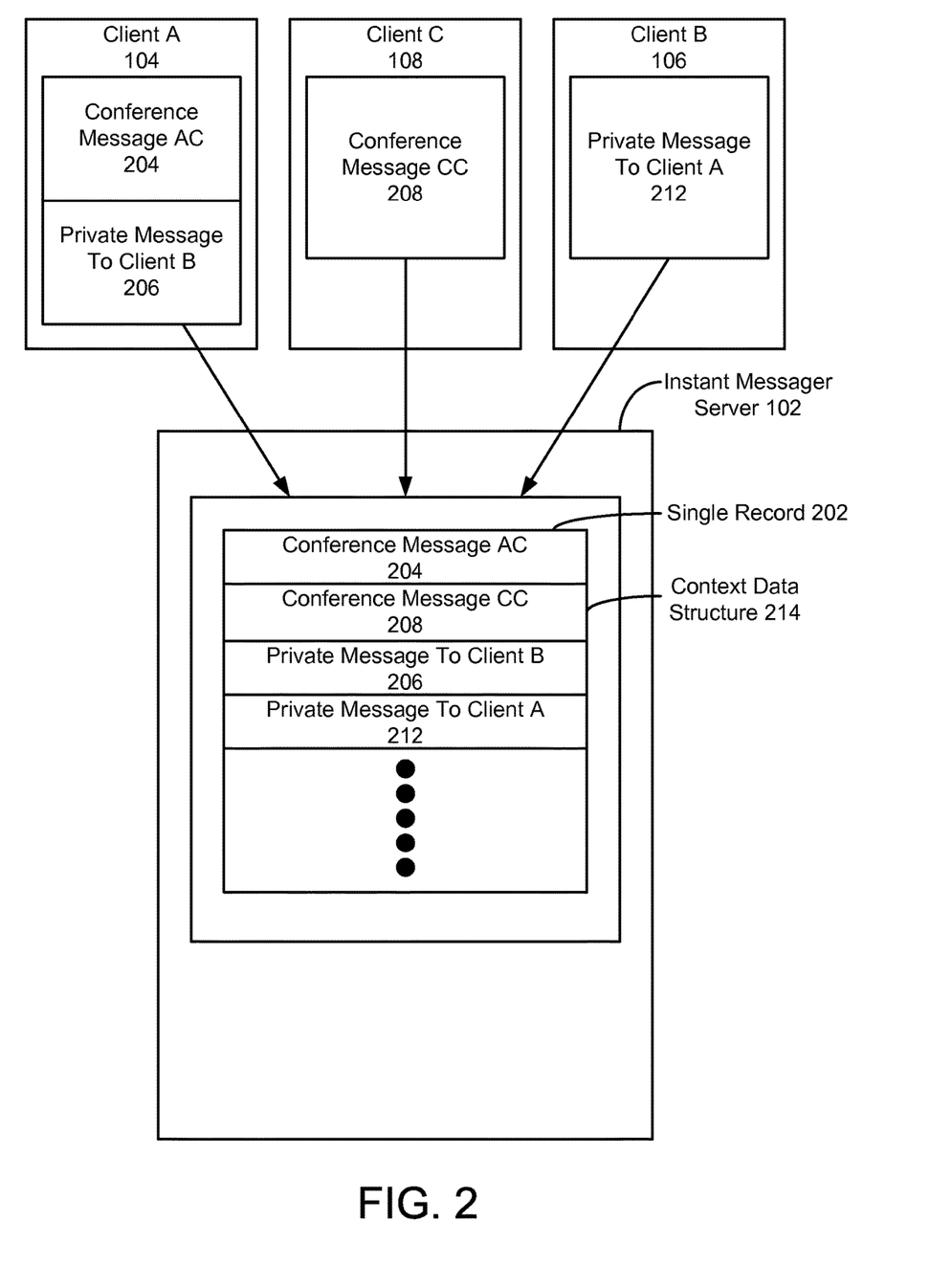
FIG. 2 is a simplified block diagram of an instant messenger server storing the conference messages and the private messages, in accordance with one embodiment of the present invention.

FIG. 2 is a simplified block diagram of an instant messenger server storing the conference messages and the private messages, in accordance with one embodiment of the present invention. Instant messenger server 102 is a server that may be responsible for hosting and tracking participant accounts and contact lists, facilitating transmission of conference messages and private messages between clients, maintaining each participant's presence information, and propagating the presence information around the network as requested. Additionally, instant messenger server 102 may store the conference messages and private messages transmitted between the clients. As shown in FIG. 2, client A 104, client C 108, and client B 106 are in communication with instant messenger server 102. In one exemplary embodiment, during an instant messaging conference discussion, client A 104 transmits conference message AC 204 to client C 108 and client B 106. In addition to conference message AC 204, client A 104 transmits private message 206 to client B 106. At the same time, client C 108 also transmits conference message CC 208 to client A 104 and client B 106, while the client B transmits private message 212 to the client A.

Since conference messages 204, 208 and private messages 206, 212 between client A 104, client B 106, and client C 108 are routed through instant messenger server 102, the instant messenger server stores the conference messages and the private messages together as a single record 202. As shown in FIG. 2, conference messages 204, 208 and private messages 206, 212 are integrated into single record 202. Accordingly, single record 202 includes conference message AC 204, conference message CC 208, private message 206 to client B 106, and private message 212 to client A 104. Single record 202 is stored in context data structure 214. Context data structure 214 provides context for storing single record 202. Exemplary context data structures include files, lists, arrays, databases, data base records, tables, etc.

Figure 3:
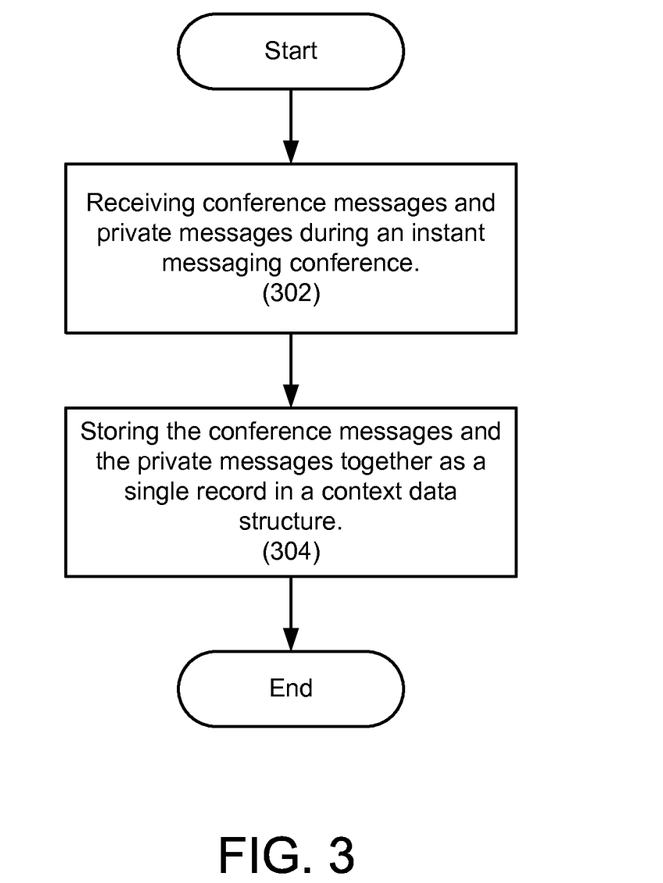
FIG. 3 is a flowchart diagram of a method for storing instant messaging messages, in accordance with one embodiment of the present invention.

FIG. 3 is a flowchart diagram of a method for storing instant messaging messages, in accordance with one embodiment of the present invention. Starting in operation 302, conference messages and private messages are received during an instant messaging conference discussion. As discussed above, the conference messages may be viewed by all participants in the instant messaging conference discussion, and the private messages are viewable by selected participants that do not include all the participants of the instant messaging conference discussion. Thereafter, the conference messages and the private messages are stored together as a single record in a context data structure in operation 304. In effect, the conference messages and the private messages are integrated into the single record.

The single record enables the maintenance of a unified record of the instant messaging conference discussion. Accordingly, as will be explained in more detail below, the unified record conveniently allows participants to search both private messages and conference messages associated with the instant messaging conference discussion from a single record. In one embodiment, the single record includes conference messages, private messages, and identifiers. Exemplary identifiers include times, names of participants that sent the private messages, names of selected participants that have permission to view the private messages, identifiers that distinguish the conference messages from the private messages, names of participants that sent the conference messages, etc. The single record may be specified in any suitable format, such as an extensible language (e.g., Extensible Markup Language (XML), Standard Generalized Markup Language (SGML), etc.) or a file based representation. The following Table A is an exemplary XML representation of a single record, in accordance with one embodiment of the present invention.

TABLE A

```
<conf-discussion confname=confl0092005201125@india.sun.com startDate=2003-06-
23 startTime=2003-06-23T23:00:00Z >
    <participants> <user>diwakar.rana@india.sun.com<user>
            <user>suresh.pendap@india.sun.com<user>
            <user> rahul.shah@india.sun.com<user>
    </participants>
    <host>suresh.pendap@india.sun.com</host>
    <message from=suresh.pendap timestamp=2003-06-23T23:01:00Z >
        <body> let us discuss about the bugs that we are going to target for next release
</body>
    </message>
    <message from=rahul.shah@india.sun.com timestamp=2003-06-23T23:02:00Z >
        <body> There are too many dispatched bugs to discuss. Let us narrow
down the list by discussing only p1, p2 bugs </body>
    </message>
    <message from=diwakar.rana@india.sun.com timestamp=2003-06-23T23:03:00Z >
        <body> i agree with rahul </body>
    </message>
</conf-discussion>
```

As shown in Table A, the XML representation includes instant messaging messages and identifiers that define the instant messaging messages. Identifiers include the start date and start time of the instant messaging conference discussion, timestamps of the conference messages, participants of the instant messaging conference discussion, names of participants that sent the conference messages, etc. In this embodiment, conference messages are exchanged between the participants Diwakar Rana, Suresh Pendap, and Rahul Shah in the instant messaging conference discussion. Accordingly, the single record shown in Table A includes conference messages between the participants. However, the participants may also exchange private messages in the instant messaging conference discussion. The following Table B is an exemplary XML representation of a single record with both conference messages and private messages, in accordance with one embodiment of the present invention.

TABLE B

```
<conf-discussion confname=confl0092005201125@india.sun.com startDate=2003-06-
23   startTime=2003-06-23T23:00:00Z >
   <participants> <user>diwakar.rana@india.sun.com<user>
               <user>suresh.pendap@india.sun.com<user>
               <user> rahul.shah@india.sun.com <user>
   </participants>
   <host>suresh.pendap@india.sun.com</host>
   <message from=suresh.pendap timestamp= 2003-06-23T23:01:00Z >
      <body> let us discuss about the bugs that we are going to target for next release
   </body>
   </message>
   <message from=rahul.shah@india.sun.com timestamp=2003-06-23T23:02:00Z >
         <body> There are too many dispatched bugs to discuss. Let us narrow
down the list by discussing only p1, p2 bugs </body>
   </message>
   <message from=diwakar.rana@india.sun.com timestamp=2003-06-23T23:03:00Z >
         <body> i agree with rahul </body>
   </message>
   <message from=diwakar.rana@india.sun.com timestamp=2003-06-23T23:04:00Z >
         <whispered >
           <to>suresh.pendap@india.sun.com</to>
         </whispered>
         <body> Do not assign swing related bugs to rahul as he is not good at
swing technology. In the past whenever he has fixed a swing related bug, he has
introduced a lot of regressions. </body>
   </message>
   <message from=suresh.pendap timestamp=2003-06-23T23:05:00Z >
         <whispered >
           <to>diwakar.rana@india.sun.com</to>
         </whispered>
         <body> yeah i agree, i will assign swing related bugs either to myself or to you.
</body>
   </message>
</conf-discussion>
```

As shown in Table B, private messages are also transmitted between the participants Suresh Pendap and Diwakar Rana during the instant messaging conference discussion. Thus, in addition to the conference messages, private messages between the participants are also integrated with the conference messages into the single record. Accordingly, in addition to the identifiers shown in Table A, the single record of Table B additionally includes identifiers (e.g., <whispered>) that distinguish the private messages from the conference messages. It should be noted that the terms "private" and "whisper" may be used interchangeably.

Figure 4:
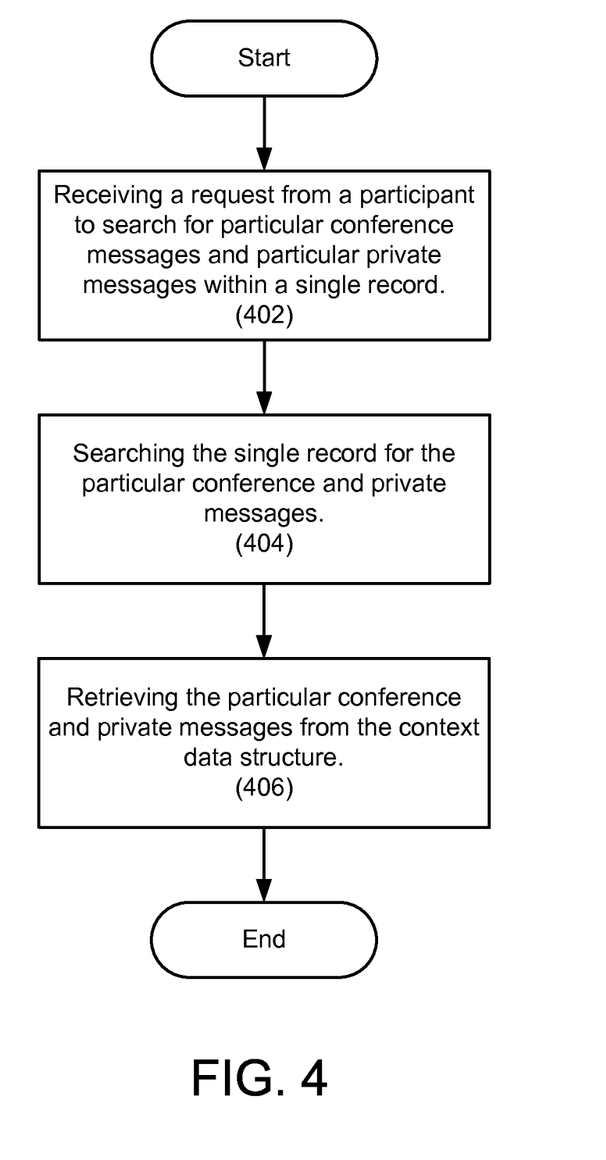
FIG. 4 is a flowchart diagram of a method for searching instant messaging messages, in accordance with one embodiment of the present invention.

FIG. 4 is a flowchart diagram of a method for searching instant messaging messages, in accordance with one embodiment of the present invention. After the termination of the instant messaging conference discussion, the conference messages and the private messages are stored together as a single record in a context data structure. The single record enables the maintenance of a unified record of the instant messaging conference discussion. Participants or other users may later access the context data structure to search particular instant messaging messages associated with the instant messaging conference discussion. As shown in FIG. 4, starting in operation 402, a request from a participant is received to search for particular conference messages and particular private messages within the single record. The search is based on a search request. The search request is any suitable information that is searchable in the single record. Exemplary search requests include keywords in the conference messages and private messages, dates or date ranges associated with the conference messages and private messages, names of the instant messaging conference discussions, etc.

Subsequently, in operation 404, the single record is searched for the particular conference messages and the particular private messages. In particular, in addition to conference messages, the search also is conducted on the private messages that the participant has permission to view, in accordance with one embodiment of the present invention. In other words, the participant may search private messages that were sent by him or were transmitted to him during an instant messaging conference discussion. As will be explained in more detail below, the participant may therefore not search private messages that are not intended for or written by him. The particular conference messages and the particular private messages that the participant has permission to view and satisfy the search request are then retrieved in operation 406. For example, in one embodiment, a request from a participant is received to search for particular conference messages and particular private messages that contain the keyword "bug council." All the conference messages and the private messages within the single record that the participant has permission to view are then searched for the keyword "bug council." Subsequently, all the conference messages and the private messages from the point when the participant entered the instant messaging conference discussion to the point when the participant left the instant messaging conference discussion that relate to "bug council" are retrieved. The search results may include multiple conference discussion records, where each record may be represented as an Uniform Resource Locator (URL) with a brief summary of the record.

In one embodiment, the search may be conducted by first blocking access to conference messages and private messages that the participant does not have permission to view, in accordance with one embodiment of the present invention. The conference messages and private messages that are accessible can then be searched for the particular conference messages and the particular private messages. In another embodiment, the search may be conducted with the use of a filter. One skilled in the art will appreciate that a filter assists a user to efficiently manage, process, and organize large amounts of information. Essentially, a filter is a program code that examines information for certain qualifying criteria and classifies the information accordingly. As such, a filter may be used to process and extract particular conference messages and particular private messages that the participant has permission to view. For example, the filter can first classify each message by determining whether the name of the participant conducting the search matches identifiers of the message that identify the names of the participants that sent the message or the names of the participants that are the intended recipients of the messages. If there is a match, then filter classifies the associated conference message or private message as viewable by the participant, and such conference message or private message may be included in the search. If there is not a match, then filter excludes the associated message from the search.

Figure 5:
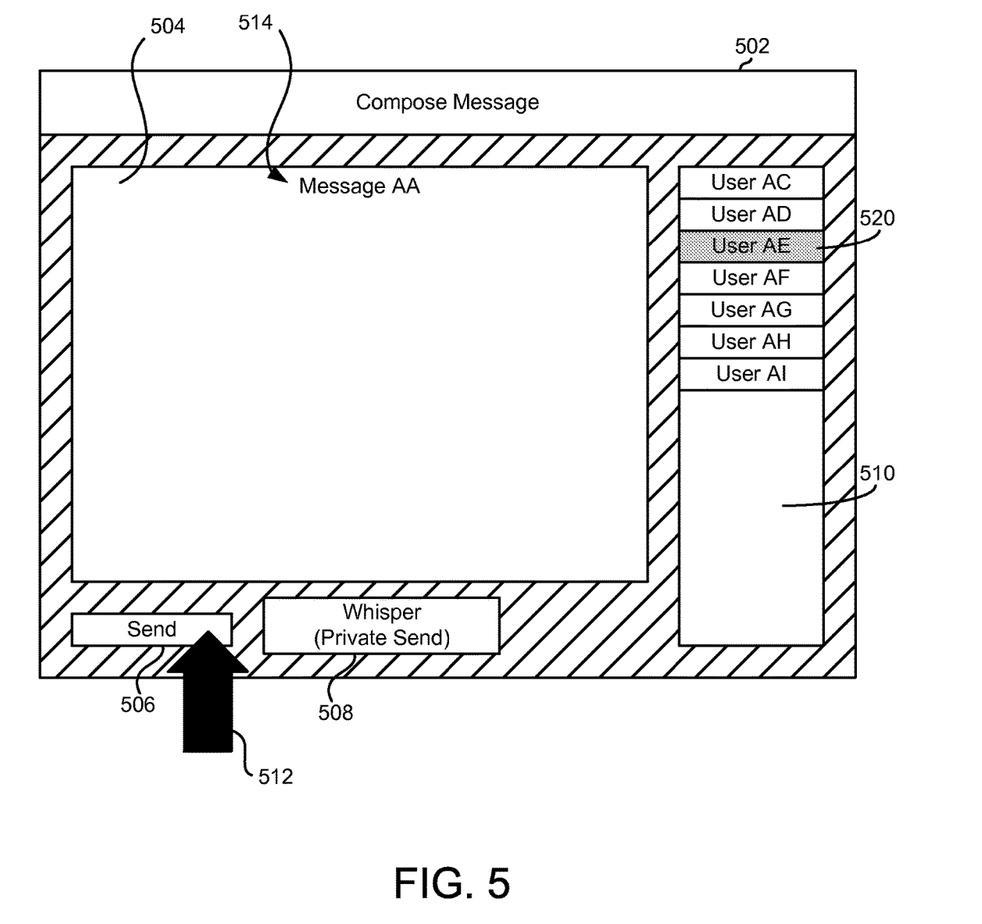
FIG. 5 is a schematic diagram of a graphical user interface (GUI) for inputting conference messages and private messages, in accordance with one embodiment of the invention.

FIG. 5 is a schematic diagram of a graphical user interface (GUI) for inputting conference messages and private messages, in accordance with one embodiment of the invention. After an instant messenger program is launched on a client, main window region 502 is rendered and displayed on a display coupled to a computing device to provide interactivity for interfacing, accessing, and managing instant messaging messages. Main window region 502 includes input window region 504, participants window region 510, send command region 506, and whisper command region (i.e., private send) 508. Input window region 504 enables input of conference messages and private messages. After a participant inputs an instant messaging message, the participant may select to transmit the instant messaging message to all participants or to selected participants of the instant messaging conference discussion. In one embodiment, the participant simply selects send command region 506 to transmit the instant messaging message inputted in input window region 504 to all the participants of the instant messaging conference discussion. The participant may select the send command region 506 through the use of a mouse, a trackball, a keyboard, a touch sensitive display, or any suitable input device. As shown in FIG. 5, the participant directs cursor 512 using a mouse onto send command region 506 and clicks the mouse button to select the send command region. In another example, the user may touch send command region 506 on a touch sensitive display to select the send command region. Instead of selecting send command region 506, the participant may also press an enter key after inputting the instant messaging message to transmit the message to all the participants of the instant messaging conference discussion, in accordance with another embodiment of the present invention.

To transmit the instant messaging message to selected participants of the instant messaging conference discussion, the participant first selects from participants window region 510 the participants (e.g., user AC, user AD, user AE, etc.) that are the intended recipients of the message. Participants window region 510 provides access to participants of the instant messaging conference discussion by allowing the participant to select any one or combination of participants in the instant messaging conference discussion. As shown in FIG. 5, an exemplary embodiment of participants window region 510 is a list of names of the participants in the instant messaging conference discussion. After the participant selects the participants from participants window region 510, the participant may select whisper command region 508 to send the inputted instant messaging message to the selected participants. For example, as shown in FIG. 5, after participant inputs message AA 514 in input window region 504, participant may select user AE 520 from participants window region 510. As a result, the participant may select whisper command region 508 to send message AA 514 as a private message to user AE 520. On the other hand, to send a conference message to all participants of the instant messaging conference discussion, the participant simply selects send command region 506 to send message AA 514 as a conference message.

Figure 6:
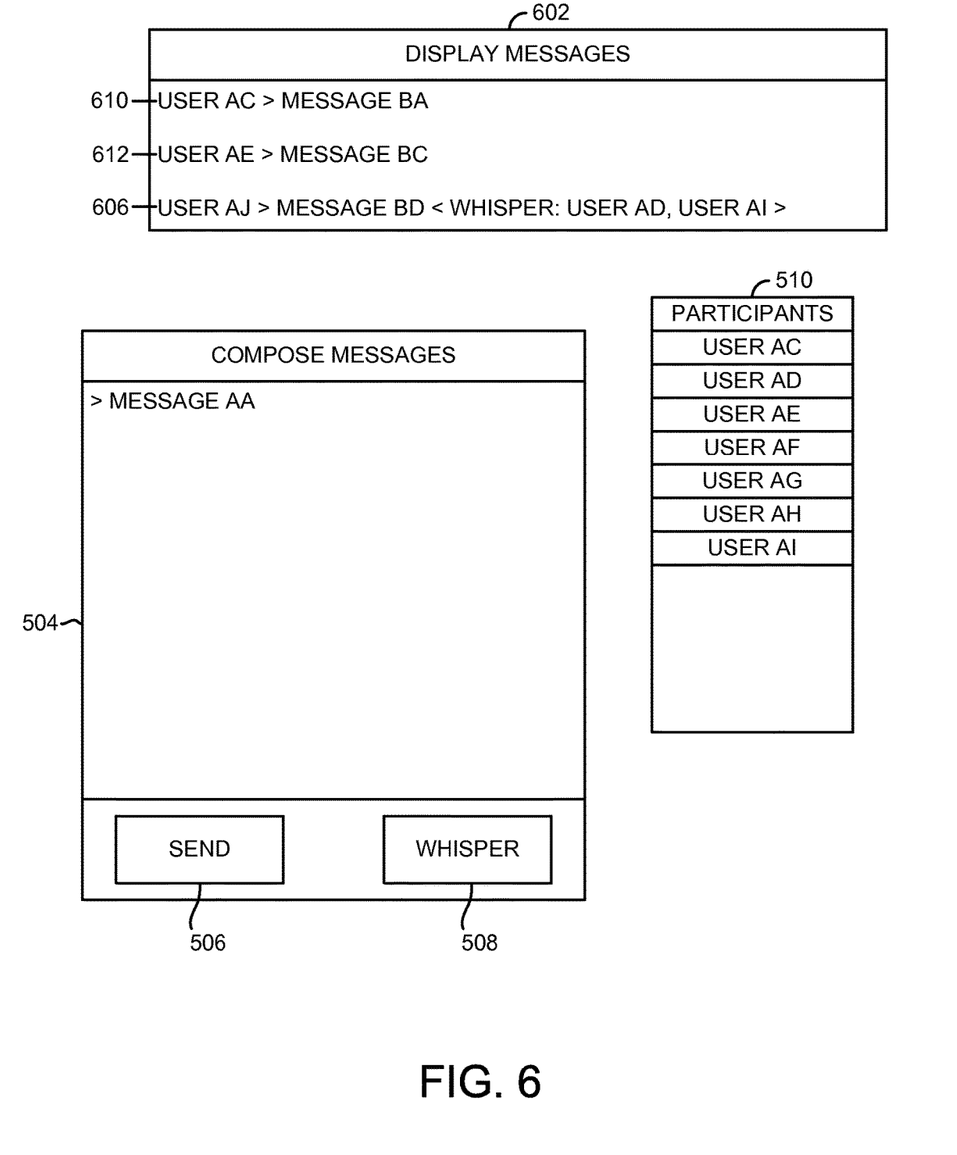
FIG. 6 is a schematic diagram of a GUI for inputting and viewing conference messages and private messages, in accordance with one embodiment of the invention.

FIG. 6 is a schematic diagram of a GUI for inputting and viewing conference messages and private messages, in accordance with one embodiment of the invention. In addition to input window region 504, participants window region 510, send command region 506, and whisper command region 508, FIG. 6 also shows message viewing region 602. Message viewing region 602 includes conference messages and private messages transmitted to and from the participant. In one embodiment, to distinguish between conference messages and private messages, message viewing region 602 includes identifiers that identify the messages as private and names of the selected participants for the private messages. Furthermore, message viewing region 602 may also include names of the participants that transmitted the message. For example, in one embodiment, as shown in FIG. 6, the <whisper> identifier identifies message BD 606 from user AJ as a private message to users AD and AI. In contrast, the messages without the <whisper> identifier and names, such as message BA 610 and message BC 612, are identified as conference messages.

Any number of suitable layouts can be designed for region layouts illustrated above as FIGS. 5 and 6 do not represent all possible layout options available. The displayable appearance of the regions can be defined by any suitable geometric shape (e.g., rectangle, square, circle, triangle, etc.), alphanumeric character (e.g., A, v, t, Q, 1, 9, 10, etc.), symbol (e.g., $, *, @, ∇, □, ¤, ♥, etc.), shading, pattern (e.g., solid, hatch, stripes, dots, etc.), and color. Furthermore, for example, send command region 506 in FIG. 5, or any other region, may be omitted or dynamically assigned. It should also be appreciated that the regions can be fixed or customizable. In addition, the computing devices may have a fixed set of layouts, utilize a defined protocol or language to define a layout, or an external structure can be reported to the computing device that defines a layout. Finally, clicking on a region of GUI as discussed above triggers code to cause the functionality described herein.

Figure 7:
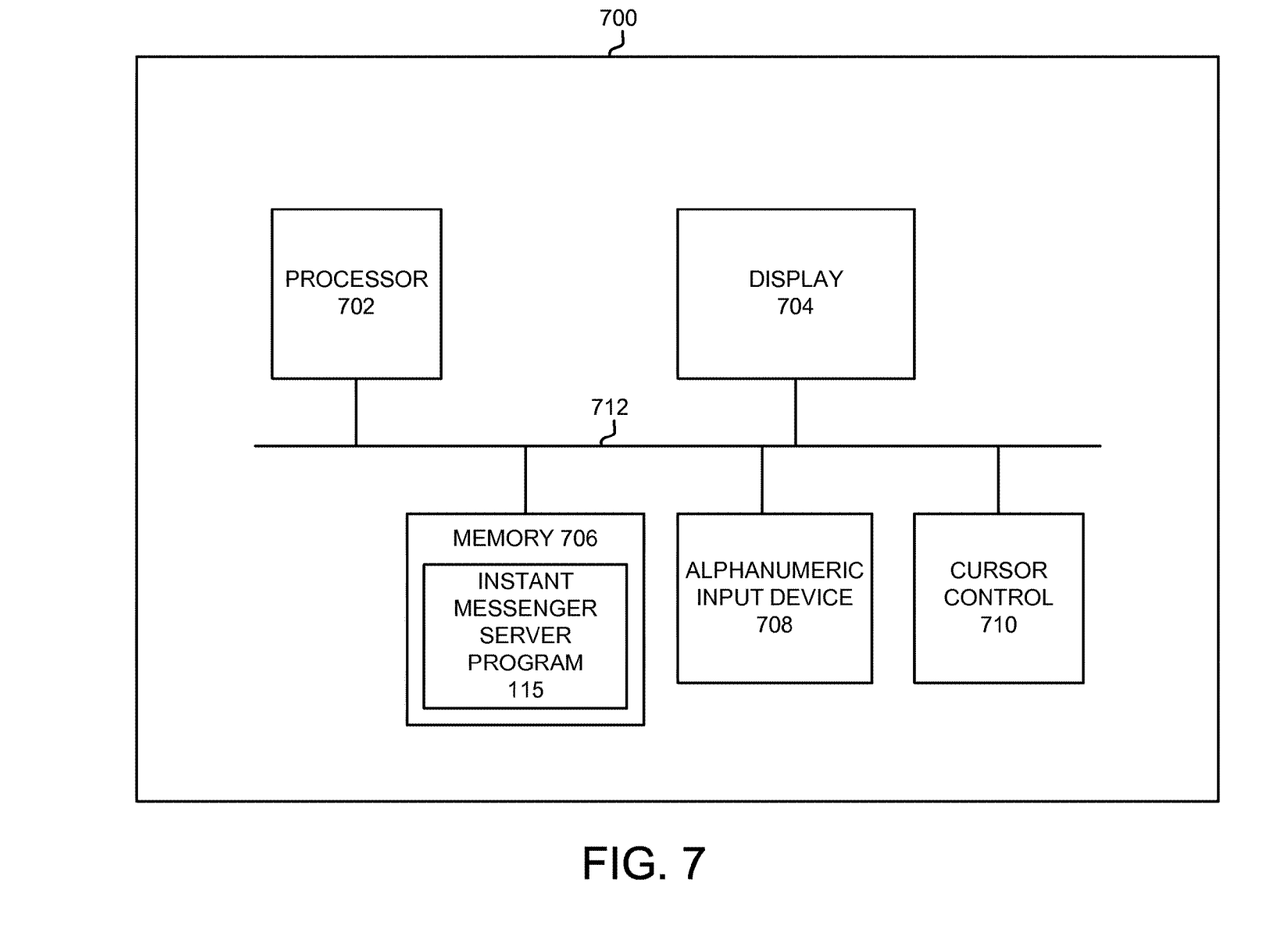
FIG. 7 is a simplified block diagram of a computer system for storing instant messaging messages and inputting conference messages and private messages, in accordance with one embodiment of the present invention.

FIG. 7 is a simplified block diagram of a computer system for storing instant messaging messages and inputting conference messages and private messages, in accordance with one embodiment of the present invention. Computer system 700 may include any suitable type of computing device. For example, as discussed above, the computing device can include a computer system based on a microprocessor, a portable computing device, a personal digital assistant, a device controller, a cell phone, or a computational engine within an appliance. As shown in FIG. 7, computer system 700 includes memory 706, processor 702, display 704, alphanumeric input 708, and cursor control 710. Memory 706 is in communication with processor 702, display 704, alphanumeric input 708, and cursor control 710 through common bus 712.

Memory 706 includes any suitable hardware that can store data. Exemplary memory 706 includes a hard drive, a network attached storage (NAS), a read-only memory, a random-access memory (RAM), a compact disc read-only-memory (CD-ROM), a compact disc recordable (CD-R), a compact disc rewritable (CD-RW), a magnetic tape, etc. In one embodiment, instant messenger server program 115 is stored in memory 706, and processor 702 may be a microprocessor or any suitable type of processor that can execute the instant messenger server program stored in the memory. In another embodiment, instant messenger program (not shown) may be stored in memory 706 and executed by processor 702.

Optionally, computer system 700 may include alphanumeric input device 708 and cursor control 710 for communicating information and command selection to processor 702. Exemplary cursor control 710 includes a mouse, a track-ball, a track-pad, an optical tracking device, a touch screen, etc. Computer system 700 may additionally include display 704 for displaying graphics, such as the GUIs discussed above. Exemplary display 704 includes cathode ray tube (CRT), liquid crystal display (LCD), plasma display, etc.

In summary, the above described invention provides methods and systems for storing instant messaging messages and GUIs for inputting the instant messaging messages. In one embodiment, to maintain a unified record of an instant messaging conference discussion, the conference messages and private messages are stored in a single record. In other words, the conference messages and the private messages are integrated into the single record. As a result, the single record provides a complete record of the instant messaging conference discussion. Therefore, the single record provides a central location for searching all instant messaging messages associated with the instant messaging conference discussion, and makes access and retrieval of instant messaging messages associated with the instant messaging conference discussion fast and efficient.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. Also, any of the operations described herein that form part of the invention can be performed by any suitable structural "means" that provide capability for performing the recited functionality. For instance, example structure is provided by way of the structural components described in the various embodiment of the claimed invention.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method, comprising operations of:
displaying a window in a graphical user interface (GUI), wherein the window includes a first view listing a plurality of participants in an instant messaging conference, a second view allowing for entry and editing of an instant message, a first control for sending an instant message to all of the of participants, and a second control for sending a private instant message to less than all of the participants;
receiving an entry of an instant message in the second view;
receiving a selection of one or more but less than all participants through the second view;
receiving an input activating the second control;
sending the instant message to the selected participants as a private message, wherein each operation of the method is executed on or more processors;
storing instant message conference data in a single unified record on an instant messenger server, wherein the instant message conference data is a complete record of the instant messaging conference discussion in chronological order, wherein each of a plurality of private instant messages exchanged for the instant messaging conference are integrated with the conference instant messages, and a given private instant message of the plurality of private instant messages is exchanged between a given subset of the participants and another private message of the plurality of private instant messages is exchanged between another subset of the participants;
filtering the instant message conference data, in response to a request for a search of the instant message conference data generated for a given user, wherein the request comprises a keyword, wherein the filtering comprises:
classifying a given subset of the plurality of private messages for the search, wherein the given user is a participant in each private message of the given subset of the plurality of private messages, and the given private message is a member of the given subset of the plurality of private messages; and excluding another subset of the plurality of private messages for the search, wherein the given user is not a participant in each private message of the other subset of the plurality of private messages, and the other private message is a member of the other subset of the plurality of private messages;

searching the given subset of plurality of private instant messages and the conference instance messages in the instant message conference data for the keyword;

determining that the given private message includes the keyword; and sending the given private message to the given user.

2. The method of claim 1, further comprising an operation of identifying the instant message as a private instant message.

3. The method of claim 1, wherein the single record is stored in a context data structure that uses a separate identifier for private instant messages.

4. The method of claim 1, wherein the single record comprises data that characterizes the conference instant messages and data that characterizes the private instant messages in a markup language.

5. The method of claim 4, wherein the markup language is extensible markup language (XML).

6. The method of claim 1, wherein the single record is specified in a file-based representation.

7. One or more computer-readable media that are non-transitory and that store instructions, which when executed by a processor, perform the following operations:

display a window in a graphical user interface (GUI), wherein the window includes a first view listing a plurality of participants in an instant messaging conference, a second view allowing for entry and editing of an instant message, a first control for sending an instant message to all of the of participants, and a second control for sending a private instant message to less than all of the participants;

receive an entry of an instant message in the second view;

receive a selection of one or more but less than all participants through the second view;

receive an input activating the second control; and send the instant message to the selected participants as a private message;

store instant message conference data in a single unified record on an instant messenger server, wherein the instant message conference data is a complete record of the instant messaging conference discussion in chronological order, wherein each of a plurality of private instant messages exchanged for the instant messaging conference are integrated with the conference instant messages, and a given private instant message of the plurality of private instant messages is exchanged between a given subset of the participants and another private message of the plurality of private instant messages is exchanged between another subset of the participants; and filter the instant message conference data, in response to a request for a search of the instant message conference data generated for a given user, wherein the request comprises a keyword, wherein the filtering comprises:

classifying a given subset of the plurality of private messages for the search, wherein the given user is a participant in each private message of the given subset of the plurality of private messages, and the given private message is a member of the given subset of the plurality of private messages; and excluding another subset of the plurality of private messages for the search, wherein the given user is not a participant in each private message of the other subset of the plurality of private messages, and the other private message is a member of the other subset of the plurality of private messages;

search the given subset of plurality of private instant messages and the conference instance messages in the instant message conference data for the keyword;

determine that the given private message includes the keyword; and send the given private message to the given user.

8. The computer-readable media of claim 7, further comprising an operation of identifying the instant message as a private instant message.

9. The computer-readable media of claim 8, wherein the single record is stored in a context data structure that uses a separate identifier for private instant messages.

10. The computer-readable media of claim 8, wherein the single record comprises data that characterizes the conference instant messages and data that characterizes the private instant messages in a markup language.

11. The computer-readable media of claim 10, wherein the markup language is extensible markup language (XML).

12. The computer-readable media of claim 8, wherein the single record is specified in a file-based representation.

13. A system, comprising:

one or more processors; and a memory disposed in communication with the one or more processors and storing processor-executable instructions, the instructions comprising instructions to:

display a window in a graphical user interface (GUI), wherein the window includes a first view listing a plurality of participants in an instant messaging conference, a second view allowing for entry and editing of an instant message, a first control for sending an instant message to all of the of participants, and a second control for sending a private instant message to less than all of the participants;

receive an entry of an instant message in the second view;

receive a selection of one or more but less than all participants through the second view;

receive an input activating the second control;

send the instant message to the selected participants as a private message;

store instant message conference data in a single unified record on an instant messenger server, wherein the instant message conference data is a complete record of the instant messaging conference discussion in chronological order, wherein each of a plurality of private instant messages exchanged for the instant messaging conference are integrated with the conference instant messages, and a given private instant message of the plurality of private instant messages is exchanged between a given subset of the participants and another private message of the plurality of private instant messages is exchanged between another subset of the participants;

filter the instant message data, in response to a request for a search of the instant message data generated for a given user, wherein the request comprises a keyword, wherein the filtering comprises:

classify a given subset of the plurality of private messages for the search, wherein the given user is a participant in each private message of the given subset of the plurality of private messages, and the given private message is a member of the given subset of the plurality of private messages; and exclude another subset of the plurality of private messages for the search, wherein the given user is not a participant in each private message of the other subset of the plurality of private messages, and the other private message is a member of the other subset of the plurality of private messages;

search the given subset of plurality of private instant messages and the conference instance messages in the conference data for the keyword;

determine that the given private message includes the keyword; and send the given private message to the given user.

14. The system of claim 13, further comprising an operation of identifying the instant message as a private instant message.

15. The system of claim 13, wherein the single record is stored in a context data structure that uses a separate identifier for private instant messages.

16. The system of claim 13, wherein the single record comprises data that characterizes the conference instant messages and data that characterizes the private instant messages in a markup language.

17. The system of claim 13, wherein the single record is specified in a file-based representation.

* * * * *

UNITED STATES PATENT AND TRADEMARK OFFICE
CERTIFICATE OF CORRECTION

PATENT NO. : 10,171,386 B1
APPLICATION NO. : 14/841702
DATED : January 1, 2019
INVENTOR(S) : Pendap et al.

It is certified that error appears in the above-identified patent and that said Letters Patent is hereby corrected as shown below:

On the Title Page

Column 2, under Abstract, Line 6, after "the" delete "of".

In the Drawings

On sheet 1 of 7, in FIG. 1, Line 7, delete "Mesages" and insert -- Messages --, therefor.

On sheet 1 of 7, in FIG. 1, Line 7, delete "Mesages" and insert -- Messages --, therefor.

On sheet 2 of 7, in FIG. 2, Line 10, delete "Messager" and insert -- Messenger --, therefor.

In the Claims

In Column 12, Line 35, in Claim 1, after "the" delete "of".

In Column 12, Line 45, in Claim 1, after "on" insert -- one --.

In Column 13, Line 38, in Claim 7, after "the" delete "of".

In Column 13, Line 44, in Claim 7, after "control;" delete "and".

In Column 14, Line 40, in Claim 13, after "the" delete "of".

Signed and Sealed this
Twenty-first Day of January, 2020

Andrei Iancu
*Director of the United States Patent and Trademark Office*